Figure 1:
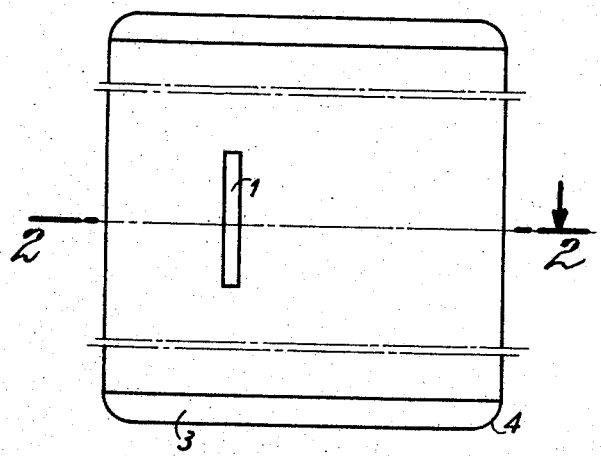

Aug. 15, 1967 C. CHATAIN ETAL 3,336,083
BALANCE WEIGHT FOR A VEHICLE WHEEL AND GRIPPER
MEMBER FOR SECURING IT ON THE RIM
Filed July 26, 1965 3 Sheets-Sheet 1

Inventors
Claude Chatain
Lucien Mathieu

By Cushman, Darby & Cushman
Attorneys

Aug. 15, 1967    C. CHATAIN ETAL    3,336,083
BALANCE WEIGHT FOR A VEHICLE WHEEL AND GRIPPER
MEMBER FOR SECURING IT ON THE RIM
Filed July 26, 1965    3 Sheets-Sheet 3

Inventors
Claude Chatain
Lucien Mathieu
By Cushman, Darby & Cushman
Attorneys

United States Patent Office 3,336,083
Patented Aug. 15, 1967

3,336,083
BALANCE WEIGHT FOR A VEHICLE WHEEL AND GRIPPER MEMBER FOR SECURING IT ON THE RIM
Claude Chatain, 17 Rue de la Republique, Noisy-le-Grand, France, and Lucien Mathieu, 35 Rue Falguiere, Paris 15, France
Filed July 26, 1965, Ser. No. 474,913
Claims priority, application France, Jan. 22, 1965, 2,875, Patent 1,430,356; Apr. 1, 1965, 11,522, Patent 87,976
9 Claims. (Cl. 301—5)

The invention relates to balance weights for motor vehicle wheels, of the type including a block-like oblong body which is maintained in yielding engagement with the rim by means of a removable clip or gripper member.

Priorly known weights closely follow the contour of the rim flange, and, in cross-section in a radial plane, the profile of the weight engages the profile of the rim along a substantial part thereof. It results that a specific pattern of weight is required for each type of rim.

It is an object of the present invention to provide an "universal" weight, the profile of which is built to one pattern and is adapted to fit in any currently available type of rim profile. Stated in other words, this universal balance weight can be mounted, without modification in respect of its shape or dimensions, on rims of varying profile.

According to the invention, this remarkable result is achieved by giving the said weight a profile comprising, on the side of the weight which is intended to be secured to the rim, at least one first radius of curvature which is relatively small and a second radius of curvature which is relatively large and is in every case at least double the first, the said radii of curvature being determined in such manner that the profile of the weight bears on the profile of any rim model with which the said weight is intended to be used, not over the entire length of the said profile but in a first and a second zone which are preferably substantially punctiform, viewed in profile, and which belong especially to the portions of the said profile having the said first and the said second radii of curvature, shaping the said weight in such manner that, when it is in use on an attached wheel, the centrifugal force applied to its centre of gravity, i.e. the vertical of the said centre of gravity, passes between the said abutment zones.

According to a further feature of the invention, the said weight is secured on the rim with the aid of a removable resilient gripper member which is applied on the rim through the agency of one of its terminal edges and, through the agency of its other terminal edge, on the side of the weight opposite that bearing on the rim, the profile of the said gripper member being designed in such manner that for any one of the rim models for which the said weight is intended, the abutment force of the gripper thereon comprises a component tending to apply the said weight against a portion of the profile of the rim the direction of which is substantially parallel to the said centrifugal force.

The invention will be more readily understood with the aid of the following description.

Figure 2:
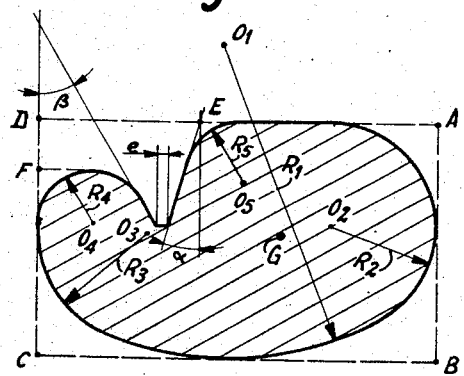
Figure 8:
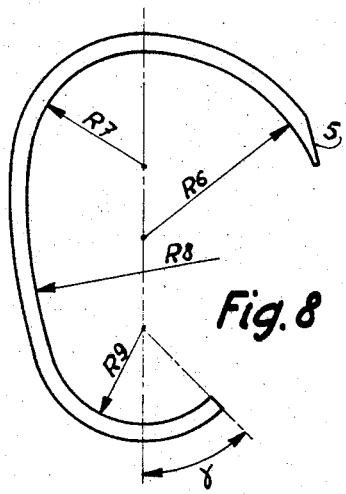
Figure 9:
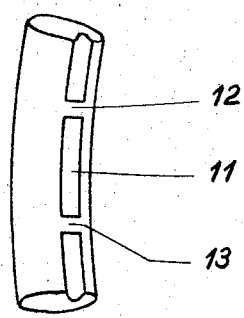
Figure 10:
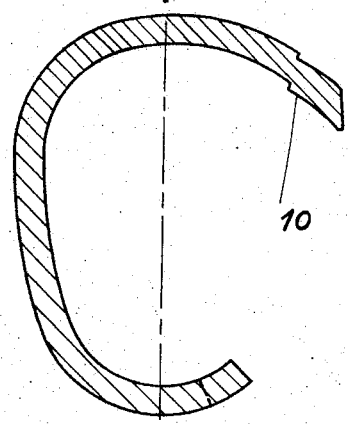
Figure 11:
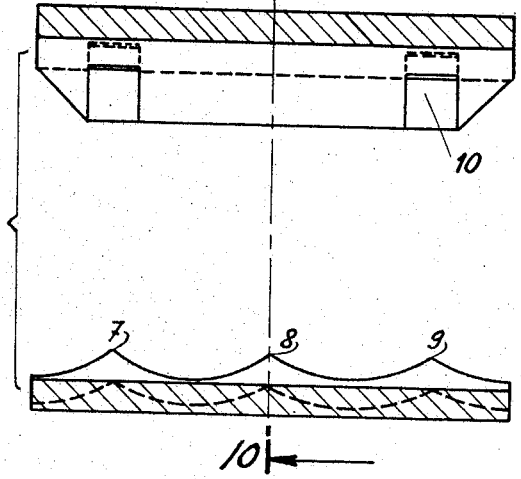

In the accompanying drawings:

FIGURE 1 is a plan view of a balancing weight according to the invention;
FIGURE 2 shows the weight in section taken along the line 2—2 of FIGURE 1;
FIGURES 3 to 7 show the said weight in position on a rim, with the securing gripper. These figures serve to illustrate the adaptation of a single model in respect of the weight and the gripper member to various rim profiles;

FIGURE 8 is an end view of a securing member associated with the said weight;
FIGURE 9 is a plan view of a balancing weight provided with two projections;
FIGURE 10 is a profile view, in section along line 10—10 of FIGURE 11, of a gripper member according to a variant;
FIGURE 11 shows the same gripper member, in section along line 11—11 of FIGURE 10.

It will be seen that the balancing weight shown in the drawings has the general shape of a cylinder the cross-section of which is illustrated by FIGURE 2.

The said cross-section is inscribed in a rectangle ABCD and the portion of the profile thereof which is intended to bear on the rim is composed of an arc of a circle having a relatively large radius $R_1$ connected at the ends thereof by two arcs of circles having a relatively small radius $R_2 = R_3$.

The opposite portion of the profile comprises a recess 1 with regard to which it will be seen (in FIGURE 1) that it affects only a central portion of the height of the cylinder. The edges of the said recess are connected respectively to the arc of a circle ($O_3$, $R_3$) by an arc of a circle ($O_4$, $R_4$) having a relatively small radius and to the arc of a circle $O_2$, $R_2$ by an arc of a circle ($O_5$, $R_5$) having a relatively small radius, followed by a flat portion 2.

By way of non-limitative example, the following dimensions are indicated:

AB=AE=9 mm.
BC=15 mm.
CF=7 mm.
$R_1$=12 mm.
$R_2$=$R_3$=4 mm.
$R_4$=$R_5$=2 mm.
width of the bottom of the recess=0.5 mm.
$\alpha$=15°.
$\beta$=30°.

Returning to FIGURE 1, it will be seen that the weight illustrated terminates, at its two ends, in cut-off faces 3 and rounded portions 4, so as to avoid sharp corners.

FIGURE 8 shows the shape of the gripper member. It will be seen that the latter has a cylindrical surface, the cross-section of the cylinder having a profile comprising a plurality of arcs of circles which are connected.

By way of non-limitative practical example, a gripper member intended for the securing of the weight defined in the numerical example given hereinabove has the following dimensions:

Height of the cylinder 18 mm.
Radii of the arcs of circles:

$R_6$=7 mm.
$R_7$=4.3 mm.
$R_8$=19 mm.
$R_9$=3.6 mm.
$\gamma$=45°.

FIGURE 8 shows that the end 5 of the gripper member which is intended to contact the tyre is bevelled, in such manner as to offer a larger contact face and to prevent cutting the tyre.

In FIGURE 3 to 7, reference numeral 6 designates the rim, $F_c$ designates a centrifugal force applied to the center of gravity G of the weight during the rotation of the wheel, $F_{p1}$ and $F_{p2}$ the pressure forces exerted on the gripper member, respectively on the rim and on the balancing weight.

The assembly of FIGURES 3 to 7 illustrates the main rim profiles encountered in practice.

It will be seen that, for all these rim profiles, it is possible to dispose the balancing weight in such manner that it is applied on the rim at two substantially punctiform zones M and N.

Of course, what are concerned in fact are contact zones which are each developed along a generatrix of the cylinder constituting the balancing weight and only their intersection by the plane of FIGURES 3 to 7 constitutes a punctiform zone. Since the rim is in fact toroidal and not cylindrical, in order to establish this double lineal contact along two generatrices of the rim and of the balancing weight, it will furthermore be necessary to slightly deform the latter manually, in such manner as to impart the appropriate curvature to the generatrices thereof. To this end, it is a provision of the invention to manufacture the balancing weight from a sufficiently plastic material, this being done, by way of non-limitative example, by modifying the conventional proportion of antimony in the lead and antimony alloy generally utilized.

When the balancing weight is in position, as just indicated, the lower end edge of the gripper member (which is also of "universal type," i.e., it is applied without any change in shape or dimensions to the various rim profiles) is applied firmly in the recess and the gripper member is rocked about the said lower edge in such manner that it nips and maintains in reciprocal abutment the rim and the balancing weight. The mounting operation which has just been described does not require the use of any special tool.

Figure 3:
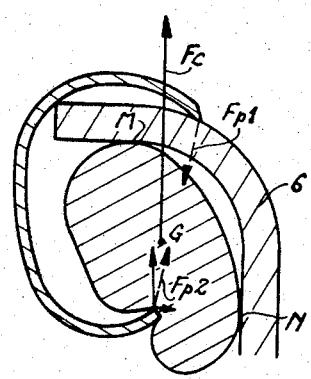
Figure 4:
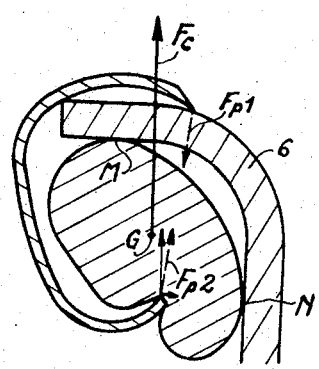
Figure 5:
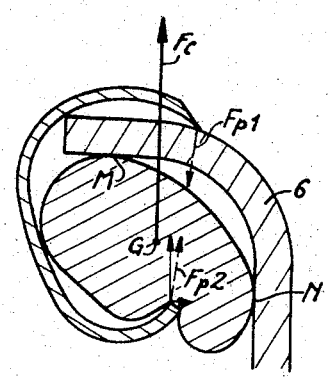
Figure 6:
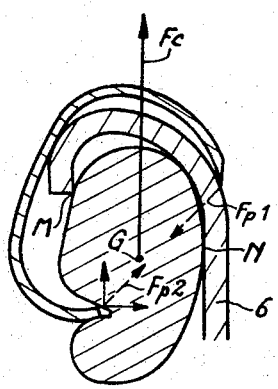
Figure 7:
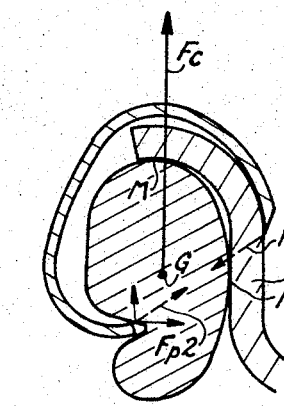

The nipping makes use of two abutment forces $F_{p1}$ and $F_{p2}$ acting along the same straight line and directed towards each other. It will be seen that the abutment force $F_{p2}$ has a component parallel to the centrifugal force $F_c$ (i.e., in practice, vertical) and a component perpendicular to $F_c$. The latter component is relatively diminished in the most disadvantageous cases of correct maintenance of the balancing weight on the rim, as illustrated in FIGURES 3 to 5. However, it suffices, even in these disadvantageous cases, to apply the weight against the vertical portion of the rim and to prevent the accidental rocking thereof.

It should be emphasized that the centrifugal force $F_c$ applied to the center of gravity G extends between the two abutment zones M and N and consequently does not tend to bring about the rocking of the balancing weight and the detachment thereof.

It will be noted that the profile of the gripper member $a$ is determined in such manner that it mates neither the shape of the rim nor that of the balancing weight. In certain cases (FIGURES 3 to 6) the gripper member bears on the rim at a second point. It may also have a second point of abutment on the balancing weight 5, but these accessory abutment points do not play an essential part in the maintenance of the gripper member or that of the balancing weight.

The essential maintenance effect is assured by the nipping movement described hereinabove. The resilience of the gripper member must of course be correctly determined in accordance with the weight of the balancing weight.

By way of non-limitative example, the thickness of the gripper member will be such that it has a useful flexion of 2 mm. for an application force of 30 kg.

The shape of the profile of the balancing weight, on the side opposite to the one bearing on the rim, has no prime importance, provided that it does not result in a distribution of the masses which would impart to the center of gravity G a position such that the centrifugal force applied thereto passes to the left of the point M and tends to rock the balancing mass. The recess 1, which is not entirely indispensable, since the gripper member does not bear on the balancing weight other than through the agency of the section of its lower edge, facilitates the placing in position of the said section which may even be embedded slightly in the balancing weight.

In the case of a rim having a rolled edge (FIGURE 6), one of the regions N of contact of the balancing weight with the rim may be not substantially punctiform, without however the weight completely mating the shape of the rim and exactly fitting the profile thereof.

On the contrary, the abutment at M is very substantially punctiform and opposes the rocking of the weight, without it being necessary to provide the latter with a recess bearing on the section of the rolled edge of the rim.

It is self-evident that the shape of the profile of the balancing weight and of the gripper member could be subject to modifications and even variants in design and construction without departing from the underlying idea of the invention.

In the variant illustrated in FIGURE 9, the face of the balancing weight is shown formed with a recess 11 in which the lower end of the gripper member will abut. Two projections 12 and 13 delimit a portion of the recess in which the lower end of the gripper member will be engaged, thus improving the securing thereof to the balancing weight.

The variant of the gripper member illustrated in FIGURES 10 and 11 has the same C-shaped general profile as that shown in FIGURE 8, but it is formed with a notch 10 which is adapted to penetrate slightly into the metal of the rim 6.

In this way a mode of securing on the rim is obtained which opposes the action of a disengagement force exerted on the gripper member.

On the other hand, during the placing in position of the gripper member, the notch 10 slides without difficulty on the surface of the rim.

According to a further feature of the invention, the section of the end edge of the gripper member which bears on the balancing weight is cut, for example in zig zag manner, in such manner as to be formed with points 7, 8, 9 which penetrate slightly into the metal alloy constituting the balancing weight, so as to improve the securing effect.

What is claimed is:

1. A vehicle wheel construction comprising a tire rim having a generally radially extending flange terminating in a generally axially outwardly extending flange, an associated balancing weight, the balancing weight comprising an elongated body which lineally engages the rim at two axially spaced areas, said body having a curved rear surface spaced from said rim between said lineal areas of engagement, one lineal area of engagement being defined by an abutment of the elongated body against the radial flange of the rim and the other lineal area of engagement being defined by an abutment of the elongated body against the axially outwardly extending flange of the rim, the cross-section of the body throughout its length being curved and having at least two cross-sectional curved areas of first and second radii, the first radius being at least double the second radius, one area of contact between the rim and the body falling within the area on the body of first radius and the other area of contact falling within the area on the body of second radius, the body being so shaped that the radial component of centrifugal force, extending through the center of gravity of the body, passes between the two areas of contact so as to prevent rocking of the body about one of its areas of contact, and a removable resilient gripper member engaging the rim and having a terminal edge engaging the weight and nipping the weight into engagement with the rim.

2. The vehicle wheel construction defined in claim 1 wherein the securing gripper member has first and second terminal edges and a profile different from the shape of the rim and of the solid balancing body, the first terminal edge bearing on the rim and the second terminal edge bearing on the solid balancing body.

3. The vehicle wheel construction defined in claim 2 wherein the profile of the gripper member is shaped in such manner that for any desired rim model for which the balancing weight may be intended, the abutment force of the gripper member on the solid body of the balancing weight comprises a substantially radial component which tends to hold the solid body against a portion of the rim.

4. The vehicle wheel construction defined in claim 2 wherein the side of the solid body opposite the side which is intended to engage the rim is formed with a recess in which the second terminal edge of the securing gripper member abuts.

5. The vehicle wheel contruction defined in claim 4 wherein the balancing body is formed with two projections delimiting a portion of the length of the recess and aiding the securing of the second terminal edge of the securing gripper member.

6. The vehicle wheel construction defined in claim 2 wherein the first terminal edge of the securing gripper member is bevelled.

7. The vehicle wheel construction defined in claim 2 wherein the securing gripper member is formed with a securing notch at its first terminal edge for abutment on the rim.

8. The vehicle wheel construction defined in claim 2 wherein a section of the second terminal edge of the gripper member is formed with points facilitating the securing thereof in the material of the solid body.

9. The vehicle wheel construction defined in claim 1 wherein the elongated body has the shape of a cylinder and is made from a material which is sufficiently moldable to enable the elongated body to be conformed to the curvature of the rim.

References Cited

UNITED STATES PATENTS

| | | | |
|---|---|---|---|
| 2,137,415 | 11/1938 | Rubsam | 301—5 |
| 2,361,406 | 10/1944 | Lyon | 301—5 |
| 2,696,408 | 12/1954 | Merriman | 301—5 |

FOREIGN PATENTS

| | | |
|---|---|---|
| 1,151,191 | 8/1957 | France. |
| 1,295,532 | 5/1962 | France. |

BENJAMIN HERSH, *Primary Examiner.*

RICHARD J. JOHNSON, *Examiner.*